US012189343B2

(12) United States Patent
Nozawa

(10) Patent No.: US 12,189,343 B2
(45) Date of Patent: Jan. 7, 2025

(54) ELECTRONIC WATCH

(71) Applicant: Seiko Epson Corporation, Tokyo (JP)

(72) Inventor: Toshiyuki Nozawa, Okaya (JP)

(73) Assignee: SEIKO EPSON CORPORATION (JP)

( * ) Notice: Subject to any disclaimer, the term of this patent is extended or adjusted under 35 U.S.C. 154(b) by 413 days.

(21) Appl. No.: 17/534,608

(22) Filed: Nov. 24, 2021

(65) Prior Publication Data

US 2022/0163927 A1 May 26, 2022

(30) Foreign Application Priority Data

Nov. 26, 2020 (JP) ................................ 2020-195829

(51) Int. Cl.
*G04C 3/14* (2006.01)
*G04G 9/00* (2006.01)

(52) U.S. Cl.
CPC ............. *G04C 3/14* (2013.01); *G04G 9/0082* (2013.01)

(58) Field of Classification Search
CPC ....... G04C 3/14; G04G 9/0082; G04G 9/0064
See application file for complete search history.

(56) References Cited

U.S. PATENT DOCUMENTS 8,848,491 B2 * 9/2014 Miyake .................. G04C 17/00 368/80
10,012,956 B2 * 7/2018 Minakuchi ............. G04C 3/146
10,128,565 B2 * 11/2018 Aizawa .................. G04R 60/10
2013/0033970 A1 2/2013 Miyake
2017/0075309 A1 3/2017 Minakuchi et al.
2018/0275610 A1 * 9/2018 Momose ................ G04G 21/02
2018/0275611 A1 * 9/2018 Momose ................ G04R 20/08
2019/0265649 A1 * 8/2019 Nakanishi ............ G04G 9/0064
2019/0265652 A1 * 8/2019 Nakanishi ............ G04G 9/0064

FOREIGN PATENT DOCUMENTS

JP 2012-202901 A 10/2012
JP 2013-032919 A 2/2013
JP 2017-053784 A 3/2017

* cited by examiner

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

An electronic watch includes a first hand that is rotated by a first motor, and indicates a higher digit of numerical information or time information, a second hand that is rotated by a second motor, and indicates a lower digit of the numerical information or the time information, and a motor controller. The motor controller performs a numerical value indication mode for driving the first motor and the second motor simultaneously to indicate an increase or decrease in the numerical information, or time correction mode for driving the first motor and the second motor simultaneously to correct the time information, and in the numerical value indication mode or the time correction mode, controls a drive frequency of the first motor and a drive frequency of the second motor such that angular velocity of hand movement of the first hand is less than angular velocity of hand movement of the second hand.

7 Claims, 14 Drawing Sheets

ELECTRONIC WATCH

The present application is based on, and claims priority from JP Application Serial Number 2020-195829, filed Nov. 26, 2020, the disclosure of which is hereby incorporated by reference herein in its entirety.

BACKGROUND

1. Technical Field

The present disclosure relates to an analog electronic watch including hands.

2. Related Art

JP 2017-53784 A discloses an analog electronic watch including a plurality of motors, and each motor independently drives a hand. The electronic watch includes a driving device for, when hands are fast-forwarded, in accordance with deceleration of moving velocity of a first hand for which hand movement is initially started, starting movement operation of a second hand for which hand movement is to be started next.

When such hand movement is applied when hour and minute hands are individually fast-forwarded, for example, then only the hour hand is fast-forwarded, movement operation of the minute hand is started after movement velocity of the hour hand is decelerated, and hand movement is performed while an original positional relationship between the hour and minute hands is not maintained, thus there is a problem of giving a user an uncomfortable feeling, for example.

SUMMARY

An electronic watch according to the present disclosure includes a first hand configured to be rotated by a first motor and indicate a higher digit of numerical information or time information, a second hand configured to be rotated by a second motor, and indicate a lower digit of the numerical information or the time information, and a motor controller configured to control the first motor and the second motor, wherein the motor controller is configured to be capable of performing a numerical value indication mode for simultaneously driving the first motor and the second motor to indicate an increase or decrease in the numerical information by hand movement of each of the hands, or a time correction mode for simultaneously driving the first motor and the second motor to correct the time information, and in the numerical value indication mode or the time correction mode, controls a drive frequency of the first motor and a drive frequency of the second motor such that angular velocity of hand movement of the first hand is less than angular velocity of hand movement of the second hand.

An electronic watch according to the present disclosure includes a first hand, a first train wheel coupled to the first hand, a first motor configured to drive the first hand via the first train wheel, a second hand, a second train wheel coupled to the second hand, a second motor configured to drive the second hand via the second train wheel, and a motor controller configured to drive the first motor and the second motor, wherein the motor controller is configured to be capable of selecting and performing a time display mode for moving the first hand and the second hand to indicate a higher digit of time information measured, and a lower digit thereof, a time correction mode for moving the first hand and the second hand to indicate a higher digit of time information corrected, and a lower digit thereof, and a numerical value indication mode for indicating a higher digit of numerical information increasing or decreasing, and a lower digit thereof, with the first hand and the second hand, while performing the time correction mode or the numerical value indication mode, moves the second hand by a prescribed number of steps corresponding to one step of the first hand, and then repeats operation of moving the first hand by one step to move the first hand to a target position, and the prescribed number of steps is different between the time correction mode and the numerical value indication mode.

DESCRIPTION OF EXEMPLARY EMBODIMENTS

Figure 1:
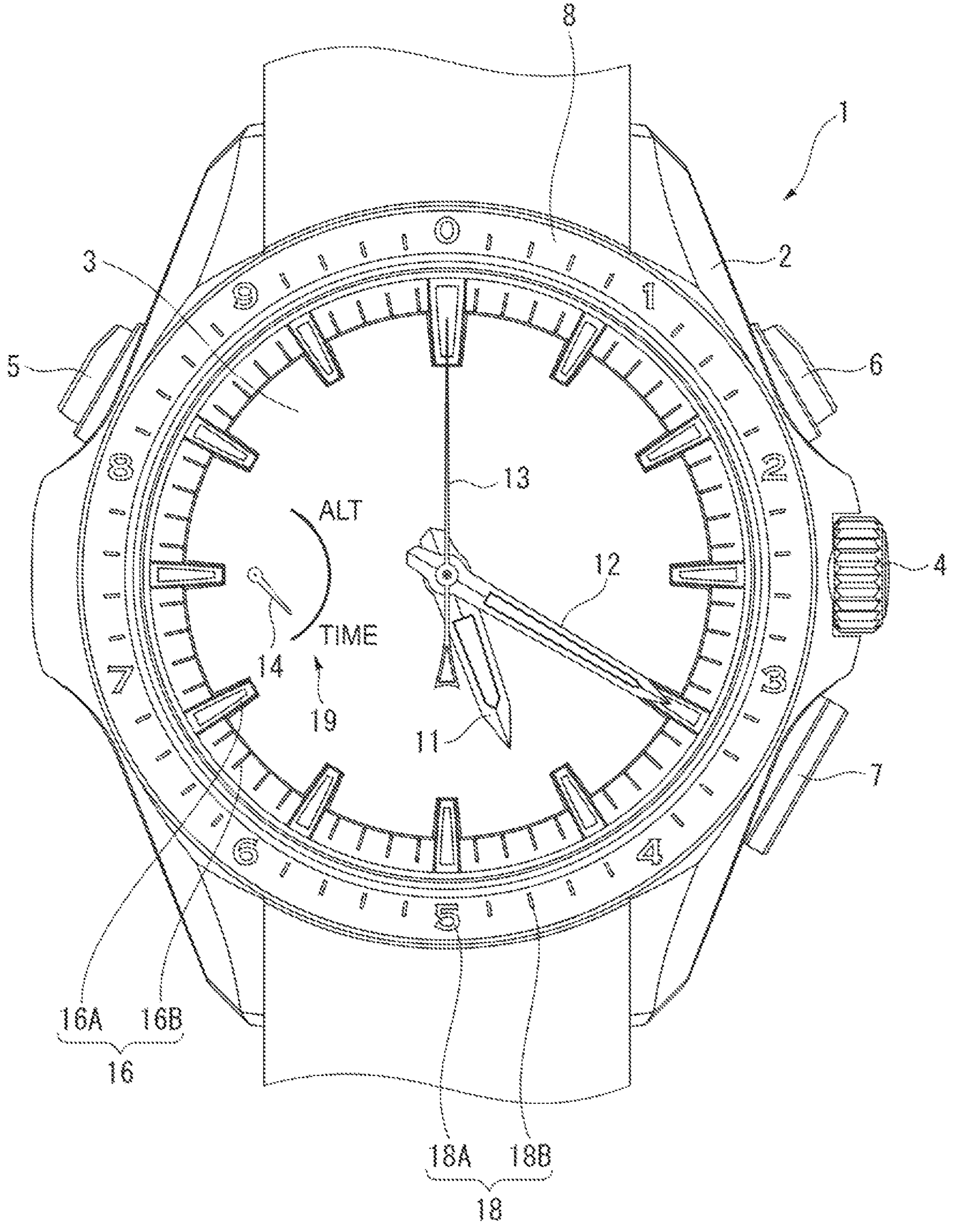
FIG. 1 is a front view illustrating an electronic watch according to a first exemplary embodiment.

As illustrated in FIG. 1, an analog electronic watch 1 according to the present exemplary embodiment is a wristwatch worn on a user's wrist, and includes an outer case 2, a dial 3 having a disk shape, an hour hand 11, a minute hand 12, a seconds hand 13, which are hands, a small hand 14 indicating an operation mode, and a movement (not illustrated). The hour hand 11, the minute hand 12, and the seconds hand 13 are center hands in which a rotary shaft is provided at a planar center position of the dial 3. The small hand 14 is a functional hand in which a rotary shaft is provided on a 9 o'clock side relative to the planar center position of the dial 3.

On a side surface of the outer case 2, relative to a center of the dial 3, a crown 4 is provided in a 3 o'clock direction, an A button 5 is provided in a 10 o'clock direction, and a B button 6 is provided in a 2 o'clock direction. An operation unit of the electronic watch 1 is configured by the crown 4, the A button 5, and the B button 6. Furthermore, an atmospheric pressure sensor 7 is provided in a 4 o'clock direction at a side surface of the outer case 2. The crown 4 is an electronic type that can output an extraction position, a rotational direction, and a rotational amount with a signal, and is not mechanically coupled to the hands. Additionally, a circular bezel 8 is provided at a front surface of the outer case 2.

Time indicators 16 are provided at the dial 3, and numerical indicators 18 are provided at the bezel 8. The time indicators 16 are indicators that are referred to when time is indicated with the hour hand 11, the minute hand 12, and the seconds hand 13, which are the hands, and are indicators obtained by dividing one lap of a circumference of 360 degrees into 60 equal portions. Specifically, time indicators 16A provided at intervals of 30 degrees along an outer circumference of the dial 3, and time indicators 16B provided at intervals of 6 degrees between the time indicators 16A are included.

The numerical indicators 18 are indicators in decimal that are referred to when a numerical value is indicated with the hour hand 11, the minute hand 12, and the seconds hand 13, which are the hands, and are indicators obtained by dividing one lap of a circumference of 360 degrees into 50 equal portions. Specifically, numeric indicators 18A provided along an inner circumference of the bezel 8 at intervals of 36 degrees or 10 equal intervals, and displayed by numbers from "1" to "0", and rod-shaped numerical indicators 18B provided between the numerical indicators 18A at intervals of 7.2 degrees or five equal intervals are included.

The dial 3 is provided with indicators 19 denoted "ALT" and "TIME" respectively, indicated by the small hand 14. "ALT" is an abbreviation for "altimeter" meaning a height indicator. The electronic watch 1 further includes an atmospheric pressure sensor 7 in a configuration of a normal quartz watch, thereby including an altimeter function based on atmospheric pressure. The small hand 14 is a mode hand that indicates a currently performed function of the electronic watch 1. Thus, a mode where the small hand 14 indicates "TIME" is a time mode where the hour hand 11, the minute hand 12, the seconds hand 13, and the time indicators 16 indicate time. Also, a mode where the small hand 14 indicates "ALT" is an altitude mode where the hour hand 11, the minute hand 12, the seconds hand 13, and the numerical indicators 18 indicate altitude.

The time mode includes a time display mode where time information measured is indicated with the hour hand 11, the minute hand 12, and the seconds hand 13, and a time correction mode where time information measured is corrected by moving the hour hand 11, the minute hand 12, and the seconds hand 13, by fast-forwarding or the like. In the present exemplary embodiment, hand movement by fast-forwarding or the like for correcting time includes both hand movement for correcting time by forward-rotating the hour hand 11, the minute hand 12, and the seconds hand 13 by fast-forwarding or the like, and hand movement for correcting time by reverse-rotating by fast-forwarding or the like.

The altitude mode is the numerical value indication mode where a numerical value indicative of altitude is indicated with the hour hand 11, the minute hand 12, the seconds hand 13, and the numerical indicators 18.

Figure 2:
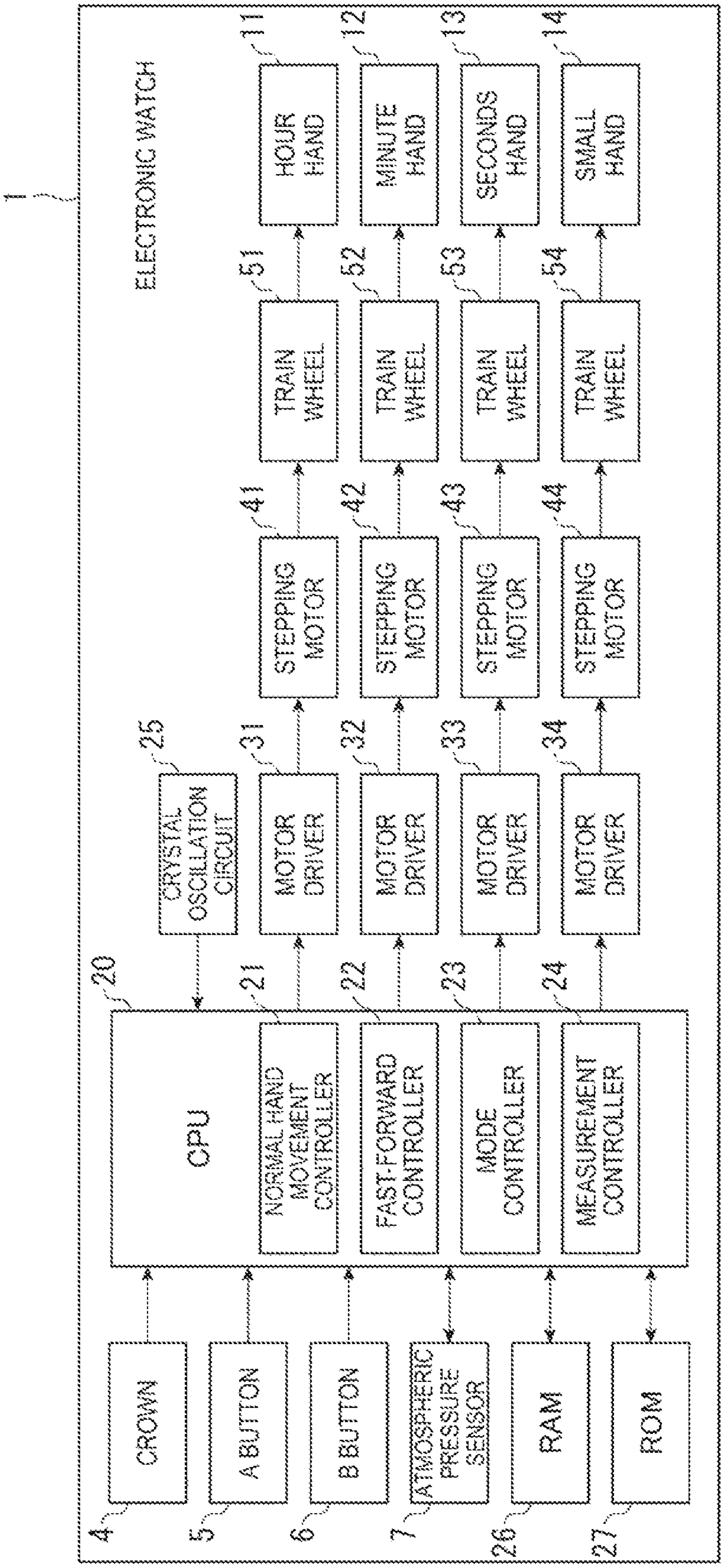
FIG. 2 is a block diagram illustrating a configuration of the electronic watch according to the first exemplary embodiment.

FIG. 2 is a block diagram illustrating a configuration of the electronic watch 1. Note that in FIG. 2, a power supply circuit is omitted.

The electronic watch 1 includes a CPU (Central Processing Unit) 20, a crystal oscillation circuit 25, a RAM (Random Access Memory) 26, and a ROM (Read Only Memory) 27. Furthermore, the electronic watch 1 includes motor drivers 31 to 34, stepping motors 41 to 44, and train wheels 51 to 54.

The CPU 20 is a controller that performs control of the watch, and realizes each function by executing a program stored in the ROM 27. The CPU 20 includes a normal hand movement controller 21, a fast-forward controller 22, a mode controller 23, and a measurement controller 24, which are realized by executing the program. The RAM 26 stores information necessary in executing the program.

The normal hand movement controller 21 is a controller performed during the time display mode, and controls the motor drivers 31 to 33 to display current time with the hour hand 11, the minute hand 12, and the seconds hand 13.

The fast-forward controller 22 is a controller performed during the time correction mode, and controls the motor drivers 31 to 33 to perform hand movement of the hour hand 11, the minute hand 12, and the seconds hand 13 by fast-forwarding.

The mode controller 23 controls the motor driver 34 to move the small hand 14 to a position indicating "TIME" when a user operates the crown 4, the A button 5, or the B button 6 to switch the display mode to the time mode, and controls the motor driver 34 to move the small hand 14 to a position indicating "ALT" when the display mode is switched to the altitude mode, which is the numerical value indication mode.

The measurement controller 24 is a controller performed in the altitude mode, which is the numerical value indication mode, operates the atmospheric pressure sensor 7 to perform atmospheric pressure measurement, calculates altitude from a measured atmospheric pressure value, and controls each of the motor drivers 31 to 33 to display the altitude with the hands.

The CPU 20 including the normal hand movement controller 21, the fast-forward controller 22, the mode controller 23, and the measurement controller 24, is configured to be able to selectively perform the time display mode, the time correction mode, and the numerical value indication mode. Furthermore, as described below, the fast-forward controller 22 and the measurement controller 24 control a drive frequency of each motor. Thus, the CPU 20 functions as a motor controller.

When operated by the user, the crown 4, the A button 5, or the B button 6 outputs a signal in accordance with the operation to the CPU 20. Further, the mode controller 23 of the CPU 20 switches a function by an operation of the A button 5 or the B button 6. Specifically, the mode controller 23 performs the time mode (TIME mode) when the A button 5 is pressed, and performs the altitude mode (ALT mode) when the B button 6 is pressed.

Additionally, in the time mode, the time display mode and the time correction mode can be switched by operating the crown 4, the A buttons 5, or the B buttons 6. For example, when the crown 4 is set to a 0-th stage position, the time display mode is set, and when the crown 4 is pulled to a first stage position or a second stage position, the time correction mode is set. Note that, instead of the operation of the crown 4, the A button 5 or the B button 6 may be operated to switch between the time display mode and the time correction mode.

The atmospheric pressure sensor 7 outputs a current atmospheric pressure to the CPU 20 as a digital value in response to a request from the CPU 20.

The crystal oscillation circuit 25 generates a reference frequency signal serving as a reference for time measurement and a clock for the CPU 20. The reference frequency is 32768 Hz, and a signal of one second can be acquired by dividing the frequency into 32768.

The hour hand 11, the minute hand 12, the seconds hand 13, and the small hand 14 are driven by the independent stepping motors via independent train wheels, respectively.

That is, the hour hand 11 is driven by the stepping motor 41, which is an hour motor, via the train wheel 51, which is an hour train wheel. The minute hand 12 is driven by the stepping motor 42, which is a minute motor, via the train wheel 52, which is a minute train wheel. The seconds hand 13 is driven by the stepping motor 43, which is a seconds motor, via the train wheel 53, which is a seconds train wheel. The small hand 14 is driven by the stepping motor 44, which is a small hand motor, via the train wheel 54, which is a small hand train wheel.

Figure 3:
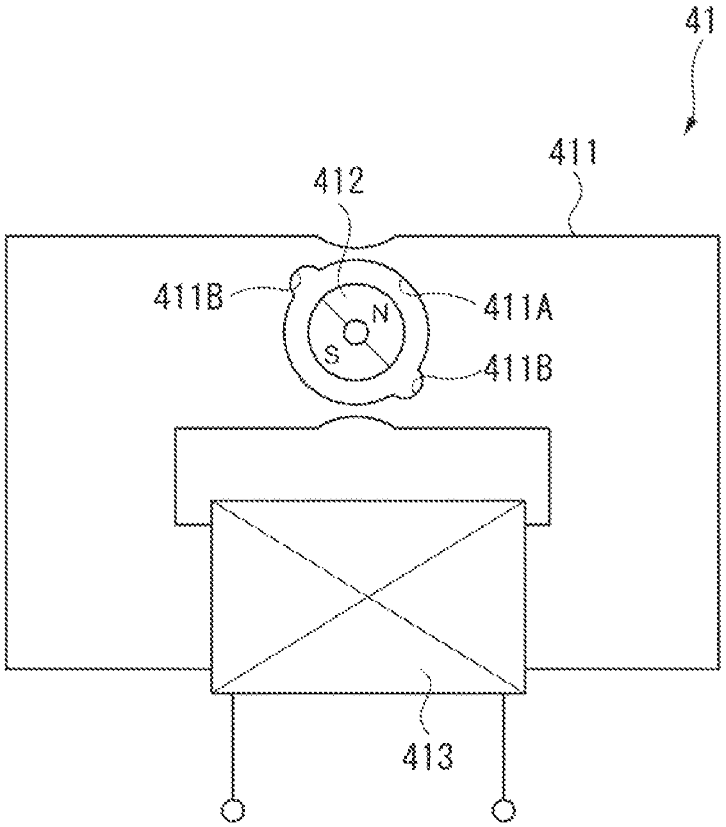
FIG. 3 is a diagram illustrating a configuration of a stepping motor according to the first exemplary embodiment.

The stepping motor 41 is constituted by a bipolar stepping motor. As illustrated in FIG. 3, the stepping motor 41 includes a stator 411 having a rotor accommodating hole 411A, a rotor 412 disposed so as to be rotatable in the rotor accommodating hole 411A, a magnetic core joined to the stator 411, and a coil 413 wound around the magnetic core. The rotor 412 is magnetized to have two poles of a south pole and a north pole, and the stator 411 is formed of a magnetic material. A pair of inner notches 411B are provided at an inner circumference of the rotor accommodating hole 411A of the stator 411 so as to face each other in a radial direction. Force acts on the rotor 412 to maintain posture such that a line segment along an opposite direction of the magnetic poles of the north and south poles of the rotor 412, that are a pair of magnetic pole directions, is orthogonal to a line segment passing through the pair of inner notches 411B. Thus, when no current flows through the coil 413, the rotor 412 maintains the posture and stops.

The stepping motor 41 is provided with a motor drive pulse from the motor driver 31, and when a current flows between terminals on both respective ends of the coil 413, magnetic flux is generated in the stator 411. As a result, the rotor 412 rotates by 180 degrees or one step in a forward- or reverse-rotational direction, due to an interaction between a magnetic pole generated in the stator 411 and a magnetic pole of the rotor 412. In this way, the rotor 412 makes half laps per step in which a motor drive pulse is supplied to the coil 413.

Note that, each of the stepping motors 42 to 44 is also provided with the same configuration as that of the stepping motor 41 illustrated in FIG. 3.

The train wheel 53 of the seconds hand 13 is configured with a deceleration ratio in which the seconds hand 13 makes a lap, while the stepping motor 43 moves by 60 steps. Thus, the seconds hand 13 rotates by 6 degrees per step of the stepping motor 43.

The train wheel 52 of the minute hand 12 has a deceleration ratio in which the minute hand 12 makes a lap, while the stepping motor 42 moves by 720 steps. The minute hand 12 rotates by 0.5 degrees per step of the stepping motor 42.

The train wheel 51 of the hour hand 11 has a deceleration ratio in which the time hand 11 makes a lap, while the stepping motor 41 moves by 720 steps. The hour hand 11 rotates by 0.5 degrees per step of the stepping motor 41.

Time Display Mode

While the time display mode is performed, the electronic watch 1 drives the stepping motors 41 to 43 by the normal hand movement controller 21, and indicates current time that is being measured, with the hour hand 11, the minute hand 12, and the seconds hand 13.

The normal hand movement controller 21 drives the stepping motor 43 by one step per second, and the seconds hand 13 moves by a one second indicator, that is 6 degrees, in one step. The normal hand movement controller 21 drives the stepping motor 42 by one step per five seconds, and the minute hand 12 moves by a one minute indicator, that is 6 degrees, in 12 steps. The normal hand movement controller 21 drives the stepping motor 41 by one step per minute, and the hour hand 11 moves by a one hour indicator, that is 30 degrees, in 60 steps.

Time Correction Mode

When the crown 4 is pulled by one stage in the time mode, the mode shifts to the time correction mode in which time correction is performed by the fast-forward controller 22. The crown 4 is an electronic type, and when the crown 4 is slowly turned, the fast-forward controller 22 can output a drive signal to the motor drivers 31 to 33, and forward time by step of one second or one minute. In addition, when the crown 4 is quickly turned, the fast-forward controller 22 outputs a fast-forward drive signal to the motor drivers 31 to 33, and fast-forwards time. When the fast-forward starts, the fast-forward is continued even when the crown 4 is not continuously turned, and when the crown 4 is moved in the fast-forward state, the fast-forward stops.

When time is corrected from currently displayed time by turning the crown 4 in the state in which the crown 4 is pulled by one stage, the mode is shifted to a mode in which time is corrected in units of second including the seconds hand 13 initially. This is to make a small correction of time convenient, and this mode is hereinafter referred to as an hour minute seconds correction mode. After the hour minute seconds correction mode is started, and the seconds hand 13 rotates and reaches a 12 o'clock position three times, the seconds hand 13 stops at the 12 o'clock position, and the mode shifts to a mode for correcting the minute hand 12 and the hour hand 11. That is, when the seconds hand 13 rotates to make two or three laps, and time is corrected in a range of two minutes to three minutes, the seconds hand 13 remains stopped at the 12 o'clock position, and only the minute hand 12 and the hour hand 11 are used for time correction. This is because, by stopping correction of the seconds hand 13, and performing hand movement only of the hour hand 11 and the minute hand 12, the hand movement of the hour hand 11 and the minute hand 12 can be quickly performed, which is convenient for greatly correcting time, and this mode is hereinafter referred to as an hour minute correction mode.

When the crown 4 is slowly turned in the hour minute seconds correction mode, time can be corrected in units of second. On the other hand, when the crown 4 is quickly turned, the seconds hand 13, the minute hand 12, and the hour hand 11 are fast-forwarded and time is continuously corrected. The fast-forward stops when the crown 4 is moved during the fast-forward. In the hour minute seconds correction mode, when the crown 4 is quickly turned to bring into a state where time is fast-forwarded, and the seconds hand 13 reaches the 12 o'clock position three times, the mode transits to the hour minute correction mode, and the seconds hand 13 stops at the 12 o'clock position. When the crown 4 is slowly turned in the hour minute correction mode, time can be corrected in units of minute. On the other hand, turning the crown 4 quickly causes the minute hand 12 and the hour hand 11 to be fast-forwarded to continuously correct time. The fast-forward stops when the crown 4 is moved during the fast-forward.

In the hour minute seconds correction mode or the hour minute correction mode, or in the time correction mode, when the crown 4 is pushed, the mode transits to the time display mode, and hand movement of the watch is resumed.

Pulling the crown 4 by one stage and turning the crown 4 quickly for time correction is a time fast-forward operation in the hour minute seconds correction mode, and fast-forward of the seconds hand 13, the minute hand 12, and the hour hand 11 is started by the fast-forward controller 22. The fast-forward controller 22 sets a drive frequency of the stepping motor 43 driving the seconds hand 13 to 16 Hz, and a drive frequency of the stepping motor 42 driving the minute hand 12 to 4 Hz. This assumes that the reference frequency of 32768 Hz is divided by the n-th power of 2. In this case, the seconds hand 13 is forwarded by 16 seconds or 96 degrees per second, angular velocity is 96 dps (degree per second), the minute hand 12 is forwarded by 20 seconds or 2 degrees per second, and angular velocity is 2 dps. The angular velocity of the seconds hand 13 is 48 times the angular velocity of the minute hand 12. Here, when the seconds hand 13 and the minute hand 12 are mechanically interlocked by a train wheel, and the second hand 13 makes a lap or moves by 360 degrees, then the minute hand 12 moves by one minute or 6 degrees, thus the angular velocity of the seconds hand 13 is 60 times the angular velocity of the minute hand 12.

Thus, when the angular velocity of the seconds hand 13 is 48 times the angular velocity of the minute hand 12, the angular velocity of the minute hand 12 is relatively fast compared to the case of mechanical interlocking. Thus, when driving is started simultaneously for the stepping motor 43 for the seconds hand 13 and the stepping motor 42 for the minute hand 12 at a set drive frequency, the minute hand 12 is forwarded as time elapses, and a relative positional relationship between the seconds hand 13 and the minute hand 12 is shifted.

Thus, the relative positional relationship between the seconds hand 13 and the minute hand 12 can be adjusted so as not to be greatly shifted, by performing correction processing for stopping driving of the minute hand 12 each time the minute hand 12 is driven by certain steps, for example six steps, and waiting for hand movement of the seconds hand 13 until the seconds hand 13 has a correct position relative to the minute hand 12.

Further, by stopping the minute hand 12 per short steps and waiting for hand movement of the seconds hand 13, time during which the minute hand 12 stops is shortened, so a state where even though the minute hand 13 continues to move, the minute hand 12 remains stopped can be prevented from continuing long. Thus, natural hand movement of the minute hand 12 and the seconds hand 13 can be performed, and it is also possible to prevent the user from feeling uncomfortable.

The fast-forward controller 22 sets a drive frequency for fast-forward and the number of driving steps, and sends a drive start signal to each of the motor drivers 31 to 34. In addition, the fast-forward controller 22, when the motor drivers 31 to 34 drive the stepping motors 41 to 44 by the number of driving steps set at the drive frequency set, and the driving ends, outputs a drive end signal to the CPU 20. Furthermore, the fast-forward controller 22 can stop the driving of the stepping motors 41 to 44, even before the driving is performed by the number of driving steps set, by sending the drive stop signal to the motor drivers 31 to 34. In this case, the fast-forward controller 22 can read the number of steps actually driven.

Next, the fast-forward hand movement processing by the fast-forward controller 22 of the CPU 20 will be described with reference to a timing chart in FIG. 4 and a flowchart in FIG. 5. Note that, in the following description, the stepping motor 41 is denoted as an hour motor 41, the stepping motor 42 as a minute motor 42, the stepping motor 43 as a seconds motor 43, and the stepping motor 44 as a small hand motor 44. In addition, in a relationship between the minute hand 12 and the seconds hand 13, the minute hand 12 is a first hand indicating a higher digit of time information, and the seconds hand 13 is a second hand indicating a lower digit of the time information. In this case, the minute motor 42 is the first motor, and the seconds motor 43 is the second motor. In addition, in a relationship between the hour hand 11 and the minute hand 12, the hour hand 11 is the first hand indicating a higher digit of the time information, and the minute hand 12 is the second hand indicating a lower digit of the time information. In this case, the hour motor 41 is a first motor, and the minute motor 42 is a second motor.

Figure 4:
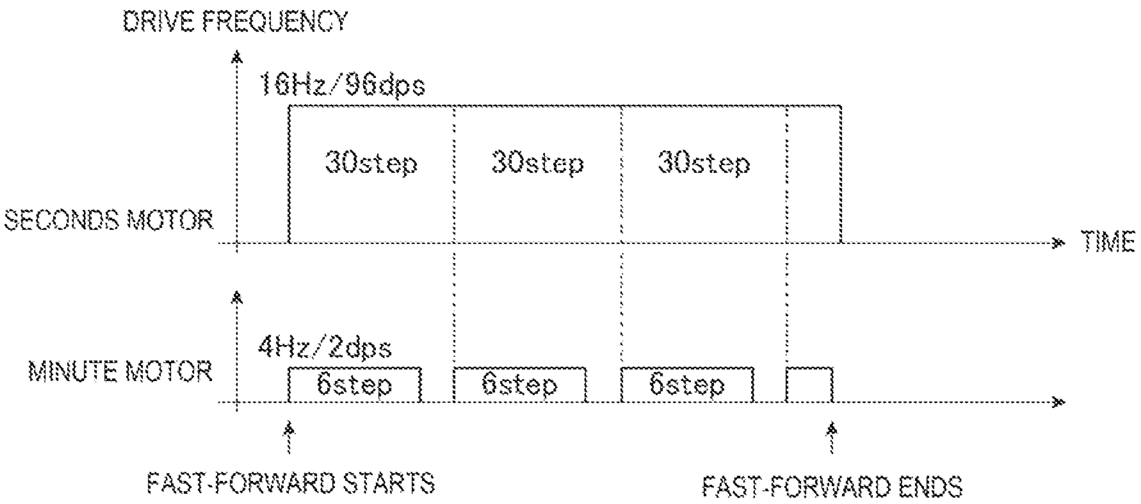
FIG. 4 is a timing chart illustrating driving operation of a seconds motor and a minute motor according to the first exemplary embodiment.

In the present exemplary embodiment, as illustrated in FIG. 4, correction processing is performed to correct relative positions of the minute hand 12 and the seconds hand 13 by moving the minute motor 42 or the minute hand 12 by six steps and stopping the hand movement of the minute hand 12 until hand movement of the seconds hand 13 is performed by 30 steps, thereby preventing a shift in positional relationship between the seconds hand 13 and the minute hand 12. The hand movement of the minute hand 12 is performed by 0.5 minutes (30 seconds) in six steps, and the number of steps of the seconds hand 13 corresponding to this amount of hand movement or 30 seconds is 30.

Figure 5:
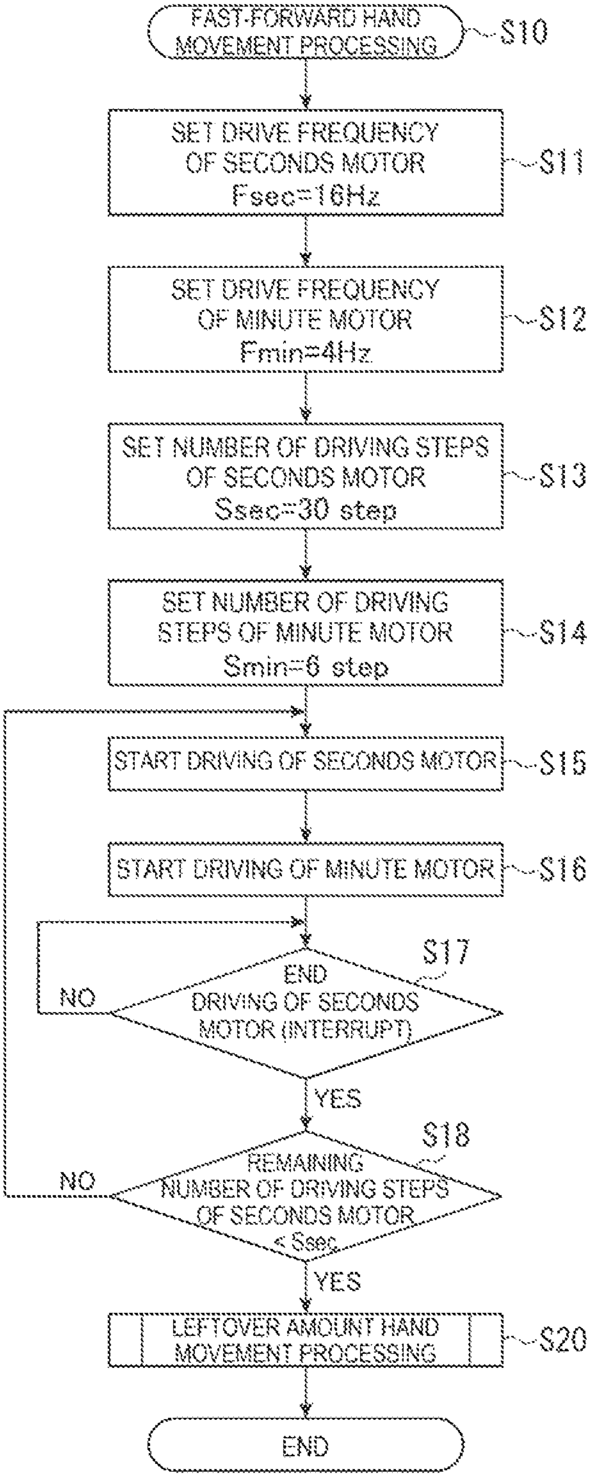
FIG. 5 is a flowchart illustrating fast-forward hand movement processing according to the first exemplary embodiment.

As described above, the fast-forward controller 22 performs the fast-forward hand movement processing S10 illustrated in FIG. 5 when the user pulls the crown 4 by one stage, and turns the crown 4 quickly to perform a time fast-forward operation in the hour minute seconds correction mode.

The fast-forward controller 22, when the fast-forward hand movement processing S10 is started, performs step S11 to set a drive frequency Fsec of the seconds motor 43 to 16 Hz.

In addition, the fast-forward controller 22 performs step S12 to set a drive frequency Fmin of the minute motor 42 to 4 Hz.

Next, the fast-forward controller 22 performs step S13 to set the number of driving steps Ssec of the seconds motor 43 to 30.

In addition, the fast-forward controller 22 performs step S14 to set the number of driving steps Smin of the minute motor 42 to six.

After setting the drive frequencies and the numbers of driving steps, the fast-forward controller 22 performs steps S15 and S16, and outputs a drive signal to the motor drivers 33 and 32 to start driving of the seconds motor 43 and the minute motor 42, respectively.

At the start of fast-forward, the fast-forward controller 22 sends a drive start signal, and outputs drive signals of the numbers of steps set in steps S13 and S14, to the seconds motor 43 and the minute motor 42 via the motor drivers 33 and 32, respectively.

After the start of the driving, the fast-forward controller 22 performs step S17 to determine whether the driving of the seconds motor 43 has ended or not. The fast-forward controller 22, when determining NO in step S17, repeats the determination processing in step S17, and when determining YES in step S17, performs step S18.

Here, the driving of the seconds motor 43 ends in 1.875 seconds, because drive signals at 16 Hz are input for 30 steps. On the other hand, the driving of the minute motor 42 ends in 1.5 seconds, because drive signals at 4 Hz are input for six steps. Thus, after the start of the driving, the driving of the minute motor 42 ends earlier, but the fast-forward controller 22 does not perform the next processing until the driving of the seconds motor 43 ends in step S17, so the minute motor 42 is once kept in a stopped state.

The fast-forward controller 22, when the driving of the seconds motor 43 ended, and YES is determined in step S17, performs step S18 to determine the number of driving steps remaining. The number of driving steps remaining is the number of steps remaining obtained by subtracting the number of driving steps of the seconds motor 43 that has been driven thus far from the target number of driving steps of the second motor 43 set by the fast-forward operation of the crown 4.

When the number of driving steps remaining of the seconds motor 43 is equal to or greater than the number of driving steps Ssec set in step S13, that is, equal to or greater than 30 steps, the fast-forward controller 22 performs steps S15 and S16 again, and starts driving of the seconds motor 43 and the minute motor 42, respectively.

On the other hand, when determining YES in step S18, that is, when the number of driving steps remaining of the seconds motor 43 is less than 30, the fast-forward controller 22 performs leftover amount hand movement processing in step S20.

Figure 6:
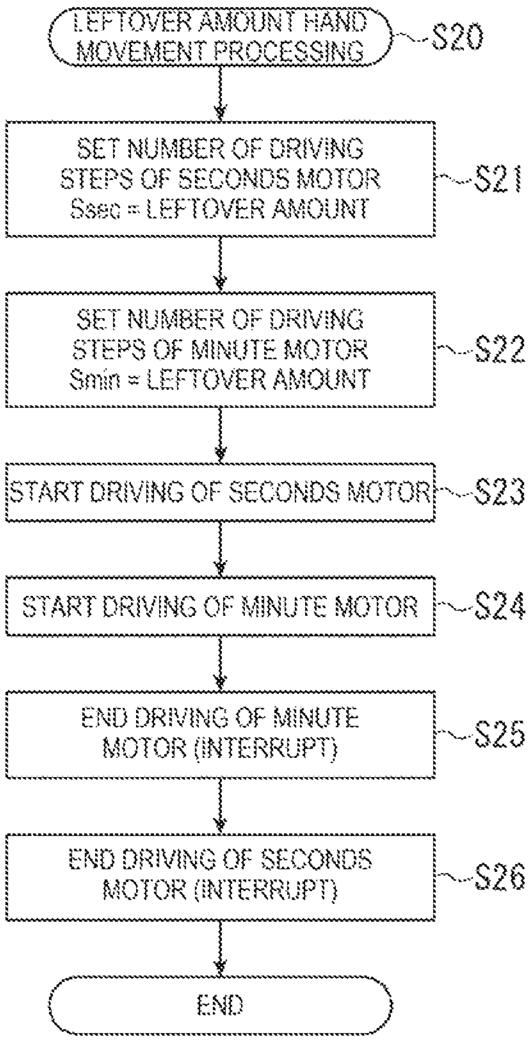
FIG. 6 is a flowchart illustrating leftover amount hand movement processing according to the first exemplary embodiment.

FIG. 6 is a flowchart of the leftover amount hand movement processing S20. The fast-forward controller 22, after performing the leftover amount hand movement processing S20, performs step S21 to set the number of driving steps Ssec of the seconds motor 43 to a remaining leftover amount.

In addition, the fast-forward controller 22 performs step S22 to set the number of driving steps Smin of the minute motor 42 to a remaining leftover amount.

After setting the numbers of driving steps, the fast-forward controller 22 performs steps S23 and S24, and outputs a drive signal to the motor drivers 33 and 32 to start driving of the seconds motor 43 and the minute motor 42, respectively.

After starting the driving in steps S23 and S24, and outputting the drive signals of the number of driving steps Smin set in step S22, the fast-forward controller 22 performs step S25 to end the driving of the minute motor 42. In addition, after outputting the drive signals of the number of driving steps Ssec set in step S21, the fast-forward controller 22 performs step S26 to end the driving of the seconds motor 43. In this manner, after the hand movement of the seconds motor 43 by the leftover amount less than 30 steps, and the hand movement of the minute motor 42 by the leftover amount less than six steps are performed, the leftover amount hand movement processing S20 ends.

As described above, the minute motor 42 and the seconds motor 43 can each be driven by the target number of driving steps, and the minute hand 12 and the seconds hand 13 can each be moved to the target position, and thus the fast-forward hand movement processing S10 also ends.

While the fast-forward hand movement processing S10 is performed in the hour minute seconds correction mode, the fast-forward controller 22 drives the hour motor 41 by one step each time the seconds motor 43 is driven by 60 steps, and moves the hour hand 11 by 0.5 degrees.

In addition, in the hour minute correction mode, for example, it is sufficient to set the drive frequency of the minute motor 42 to 128 Hz, the number of driving steps to 120, a drive frequency of the hour motor 41 to 16 Hz, the number of driving steps to 10, and the like, to control driving of the minute motor 42 and the hour motor 41.

Note that, in the fast-forward hand movement processing S10, and the leftover amount hand movement processing S20, the CPU 20 sequentially outputs an instruction for starting driving of the motor, and a shift occurs between drive start timing of the seconds motor 43 and the minute motor 42 by several micro seconds. However, because the user of the electronic watch 1 is unable to recognize such a slight shift, it can be regarded that the minute motor 42 and the seconds motor 43 simultaneously start driving. That is, it is sufficient that, in the electronic watch 1, by simultaneously starting driving of the motors driving the respective hands, the user can recognize that the hand driven by the respective motors were driven simultaneously, for example, it is sufficient that a shift in drive start timing is sufficiently short with respect to a cycle of a drive frequency of either motor.

In addition, in the present exemplary embodiment, each time the minute motor 42 that drives the minute hand 12 is driven by certain steps, the seconds motor 43 that drives the seconds hand 13 is temporarily stopped until the seconds motor 43 is driven by certain steps, and the relative positional relationship between the seconds hand 13 and the minute hand 12 is corrected, but the correction may be performed every unit time, such as every one second, for example.

According to the first exemplary embodiment as described above, even when time indicated is corrected with the plurality of hands of the hour hand 11, the minute hand 12, and the seconds hand 13 by a fast-forward operation, it is possible to display an increase or decrease of each hand can be displayed with continuity. That is, even when hand movement is started simultaneously for the minute hand 12 and the seconds hand 13, the hand movement of the minute hand 12 can be prevented from ending too early, with respect to the hand movement of the seconds hand 13, the same hand movement as when the respective hands are mechanically interlocked can be realized, and each hand can be fast-forwarded without the user feeling uncomfortable.

Also, hand movement can be started simultaneously for the minute hand 12 and seconds hand 13, and the hand movement of the minute hand 12 and seconds hand 13 is performed in the same positional relationship as when the hands are mechanically interlocked, thus the user can easily grasp an increase or decrease in time by viewing the hands during the hand movement.

Second Exemplary Embodiment

Next, a second exemplary embodiment will be described with reference to FIG. 7 and FIG. 8. In the first exemplary embodiment, the drive frequency of each of the stepping motors 42 and 43 is set by dividing the reference frequency signal of 32768 Hz by n-th power of 2. On the other hand, the second exemplary embodiment relates to fast-forward control when a circuit configuration is employed in which the drive frequency of each of the stepping motors 42 and 43 can be set as desired.

Figure 7:
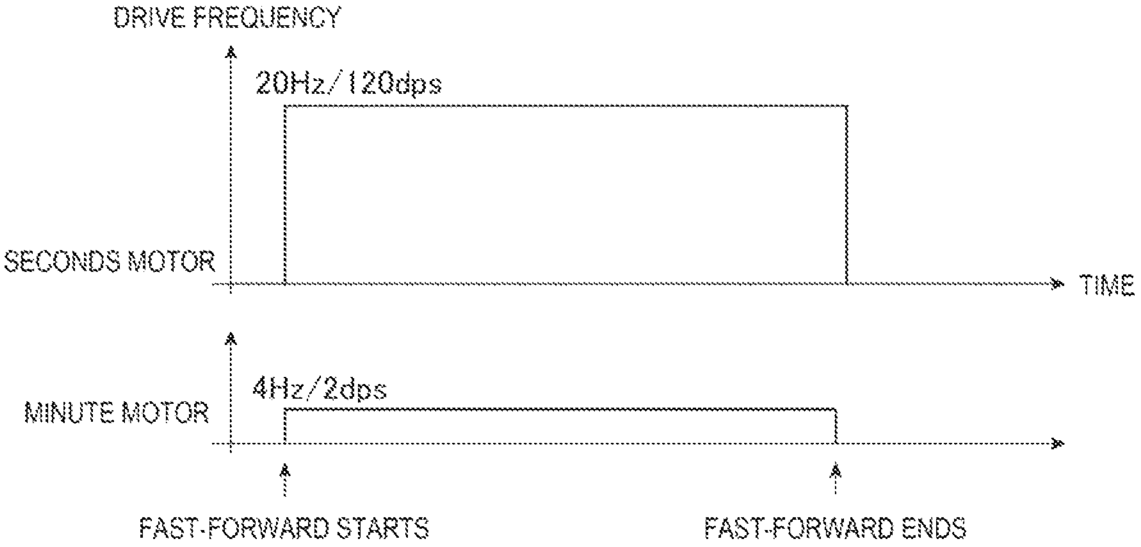
FIG. 7 is a timing chart illustrating driving operation of a seconds motor and a minute motor according to a second exemplary embodiment.

As illustrated in FIG. 7, in the second exemplary embodiment, the drive frequency of the seconds motor 43 driving the seconds hand 13 is set to 20 Hz, and the drive frequency of the minute motor 42 driving the minute hand 12 is set to 4 Hz in the hour minute seconds correction mode. Thus, the seconds hand 13 is forwarded by 20 seconds or 120 degrees per second, and the angular velocity is 120 dps. Further, the minute hand 12 is forwarded by 20 seconds or 2 degrees per second, and the angular velocity is 2 dps. The angular velocity of the seconds hand 13 is 60 times the angular velocity of the minute hand 12, and a ratio is the same as when the seconds hand 13 and the minute hand 12 are mechanically interlocked. That is, when the minute hand 12 is a first hand, and the seconds hand 13 is a second hand, the angular velocity of the hand movement of the minute hand 12 is 1/60 of the angular velocity of the hand movement of the seconds hand 13. Thus, the relative positional relationship between the seconds hand 13 and the minute hand 12 is not shifted during fast-forward of time, and natural fast-forward hand movement can be performed with very simple control.

Figure 8:
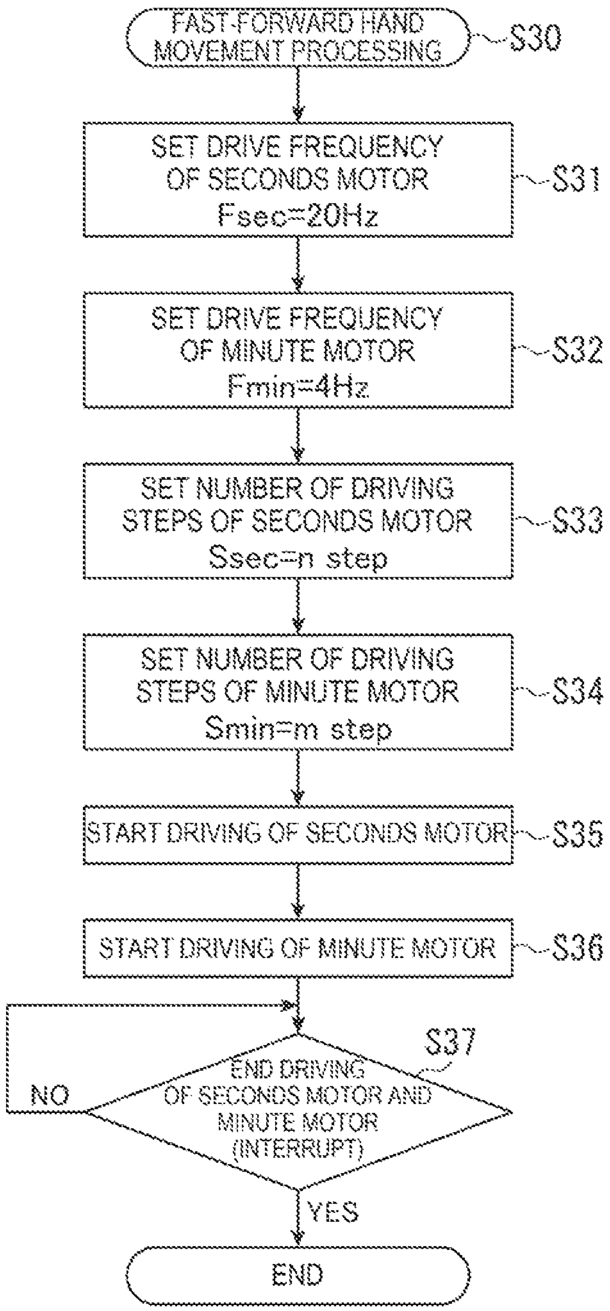
FIG. 8 is a flowchart illustrating fast-forward hand movement processing according to the second exemplary embodiment.

Next, in the second exemplary embodiment, fast-forward hand movement processing S30 when the number of steps by which hand movement is performed by a fast-forward operation in the hour minute seconds correction mode is determined is illustrated in a flowchart in FIG. 8. The fast-forward controller 22 performs step S31 to set the drive frequency Fsec of the seconds motor 43 to 20 Hz, when the fast-forward hand movement processing S30 is started. In addition, the fast-forward controller 22 performs step S32 to set the drive frequency Fmin of the minute motor 42 to 4 Hz.

Next, the fast-forward controller 22 performs step S33 to set the number of driving steps Ssec of the seconds motor 43 to n. In addition, the fast-forward controller 22 performs step S34 to set the number of driving steps Smin of the minute motor 42 to m. n and m are each the number of driving steps determined by the fast-forward operation.

After setting the drive frequencies and the numbers of driving steps, the fast-forward controller 22 performs steps S35 and S36, and outputs a drive signal to the motor drivers 33 and 32 to start driving of the seconds motor 43 and the minute motor 42, respectively.

After the start of the driving, the fast-forward controller 22 performs step S37 to determine whether the driving of the seconds motor 43 and the minute motor 42 has ended or not. As described above, in the second exemplary embodiment, the angular velocity of each of the seconds hand 13 and the minute hand 12 is the same as when the hands are mechanically interlocked, and thus when the driving is started simultaneously, drive end timing is the same.

When determining NO in step S37, the fast-forward controller 22 continues the hand movement of the seconds hand 13 and the minute hand 12, and repeats the determination processing in step S37. Further, when determining YES in step S37, the fast-forward controller 22 ends the fast-forward hand movement processing S30 because the minute hand 12 and the seconds hand 13 each have reached a target position. Note that, in the hour minute seconds correction mode, it is sufficient that the hour motor 41 is driven by one step, each time hand movement of the seconds motor 43 by 60 seconds.

Figure 9:
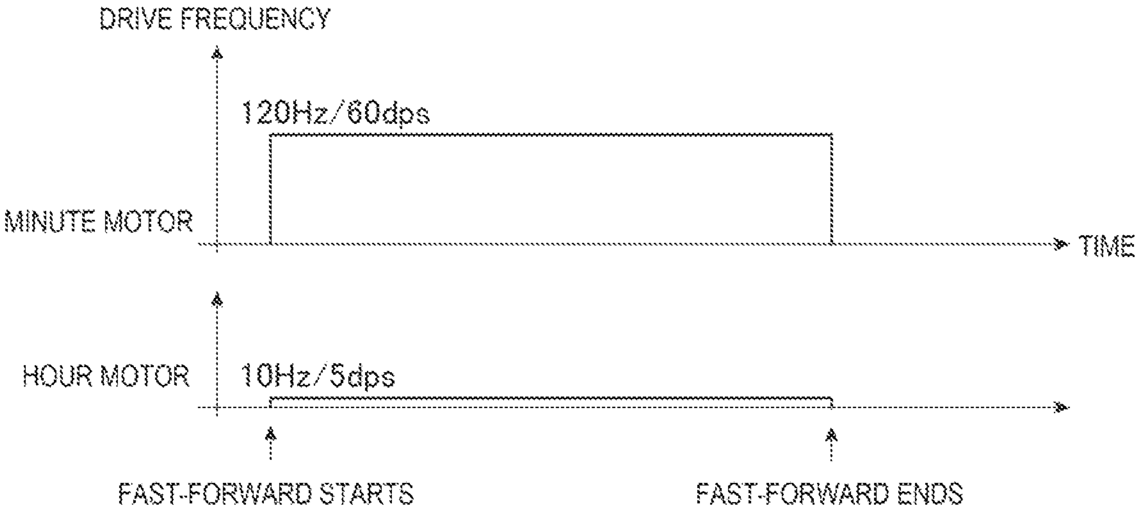
FIG. 9 is a timing chart illustrating driving operation of the minute motor and an hour motor according to the second exemplary embodiment.

Next, processing is described when fast-forward of time is continued in the hour minute seconds correction mode, and the mode enters into the hour minute correction mode. In the hour minute correction mode, in order to largely correct time, it is desirable to move the minute hand 12 quickly. Thus, the drive frequency of the minute motor 42 is set higher than in the hour minute seconds correction mode. Here, as illustrated in FIG. 9, when the drive frequency of the minute motor 42 driving the minute hand 12 is set to 120 Hz, and the drive frequency of the hour motor 41 driving the hour hand 11 is set to 10 Hz, the angular velocity of the minute hand 12 is 60 dps, and the angular velocity of the hand 11 is 5 dps. When the hour hand 11 and the minute hand 12 are mechanically interlocked, the hour hand 11 moves by 30 degrees to a 1 o'clock position while the minute hand 12 makes a lap or moves by 360 degrees, so that when the time is corrected, the angular velocity of the minute hand 12 is 12 times the angular velocity of the hand 11. That is, when the hour hand 11 is a first hand, and the minute hand 12 is a second hand, the angular velocity of the hand movement of the hour hand 11 is 1/12 of the angular velocity of the hand movement of the minute hand 12. When the drive frequency of the minute motor 42 is set to 120 Hz, and the drive frequency of the hour motor 41 is set to 10 Hz, and driving is started simultaneously, the angular velocity of the hand movement of the hour hand 11 is 1/12 of the angular velocity of the hand movement of the minute hand 12, thus the relative positional relationship between the hour hand 11 and the minute hand 12 remains correct. Thus, as with the fast-forward processing of the seconds hand 13 and the minute hand 12, natural fast-forward hand movement can be performed with very simple control.

Note that, the case where driving is started simultaneously for the seconds motor 43 and the minute motor 42, and the case where driving is started simultaneously for the minute motor 42 and the hour motor 41 include a case where start time is shifted for a short period of time that the user cannot recognize, as in the case of the first exemplary embodiment.

Operations and Effects of Second Exemplary Embodiment

In the second exemplary embodiment, the drive frequencies of the minute motor 42 and the seconds motor 43 are respectively set such that a ratio of the angular velocity of the minute hand 12 and the angular velocity of the seconds hand 13 is the same as when the hands are mechanically interlocked, thus by setting the numbers of hand movement steps n and m, and starting driving simultaneously for the seconds motor 43 and the minute motor 42, the seconds hand 13 and the minute hand 12 are kept in the correct positional relationship until the driving of the respective motors is completed. Thus, correct hand movement can be achieved with simple control in which driving is started and ended simultaneously for the minute motor 42 and the seconds motor 43.

Similarly, also in the hour minute correction mode, the drive frequencies of the hour motor 41 and the minute motor 42 are respectively set such that a ratio of the angular velocity of the hour hand 11 and the angular velocity of the minute hand 12 is the same as when the hands are mechanically interlocked, thus by starting driving simultaneously for the hour motor 41 and the minute motor 42, the hour hand 11 and the minute hand 12 are kept in the correct positional relationship until the driving of the respective motors is completed. Thus, correct hand movement can be achieved with simple control in which driving is started and ended simultaneously for the hour motor 41 and the minute motor 42.

Third Exemplary Embodiment

Figure 10:
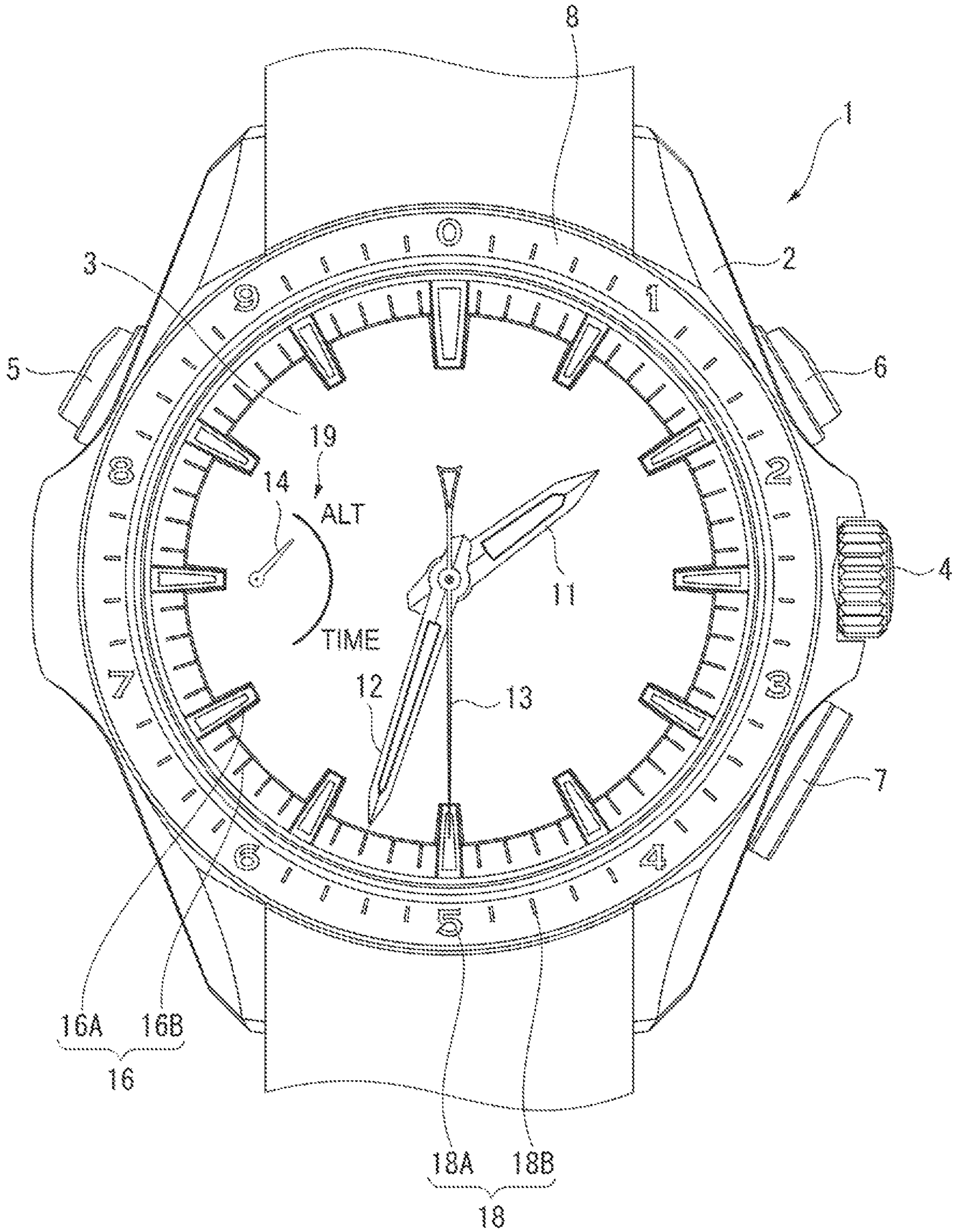
FIG. 10 is a front view illustrating an electronic watch according to a third exemplary embodiment.
Figure 11:
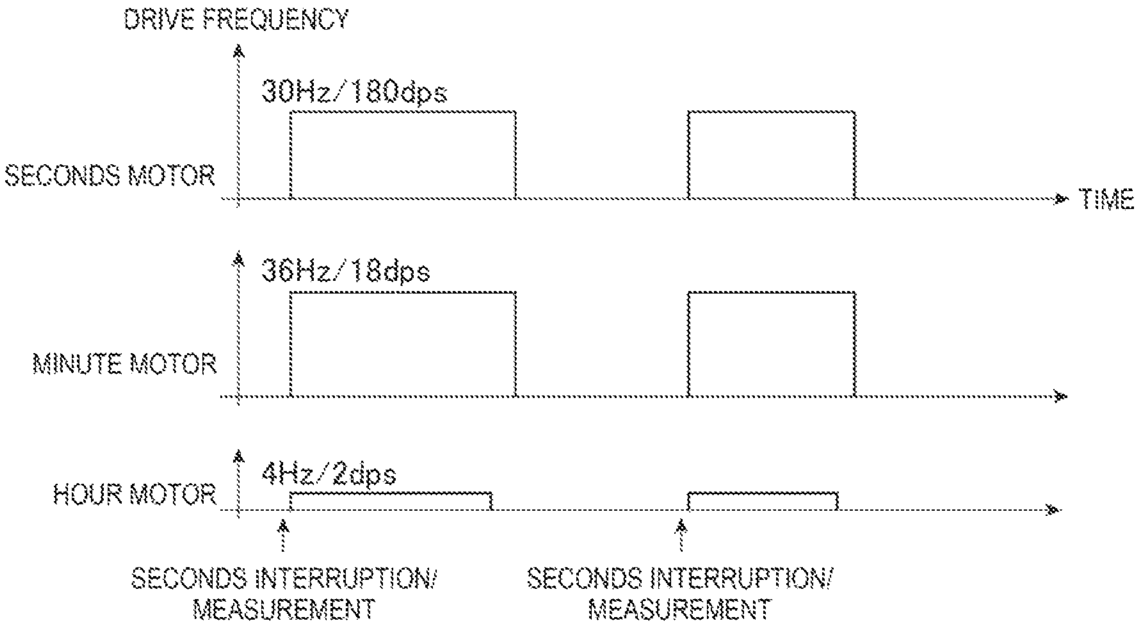
FIG. 11 is a timing chart illustrating driving operation of a seconds motor, a minute motor, and an hour motor according to the third exemplary embodiment.
Figure 12:
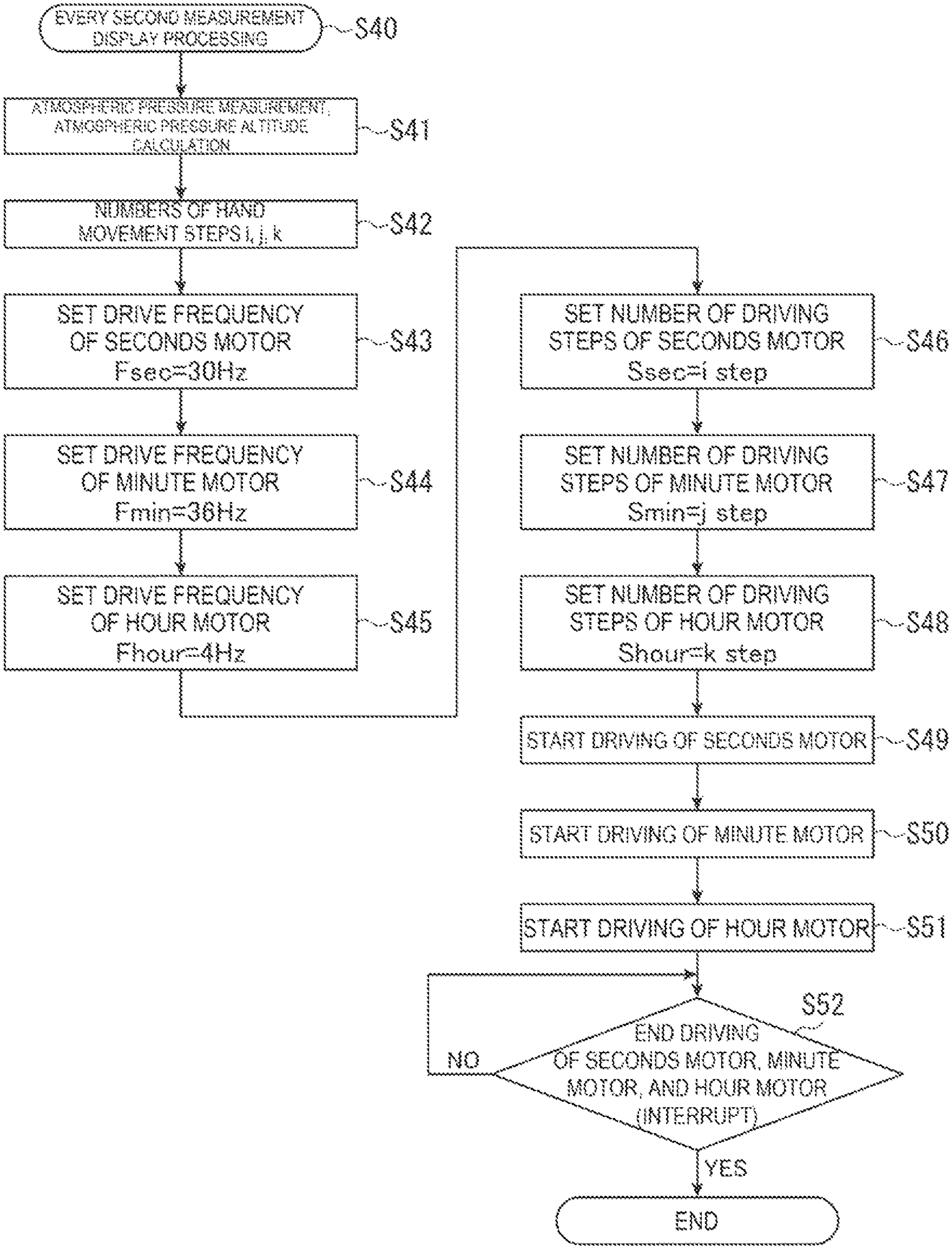
FIG. 12 is a flowchart illustrating every second measurement display processing according to the third exemplary embodiment.

Next, the electronic watch 1 according to a third exemplary embodiment will be described with reference to FIG. 10 to FIG. 12.

In the third exemplary embodiment, operation when the electronic watch 1 is set to the altitude mode, which is the numerical value indication mode, will be described. As illustrated in FIG. 10, when the electronic watch 1 is set to the altitude mode, the mode controller 23 outputs a drive signal to the motor driver 34 to operate the small hand motor 44, and moves the small hand 14 to a position indicating "ALT".

The measurement controller 24 performs atmospheric pressure measurement using the atmospheric pressure sensor 7 once per second, determines altitude from an atmospheric pressure value obtained, and indicates this altitude using the hour hand 11, the minute hand 12, and the seconds hand 13.

In the altitude mode, the seconds hand 13 represents tens place and ones place of a value of the altitude, and represents a numerical value from "0" to "99" by indicating the numerical indicator 18 in decimal, provided at the bezel 8. Similarly, the minute hand 12 represents a hundreds place, and represents a numerical value from "0" to "9" at the hundreds place. The hour hand 11 represents a thousands place, and represents a numerical value from "0" to "9" at the thousands place. In the example of FIG. 10, it can be seen that, the seconds hand 13 indicates "5" of the numerical indicator 18 on the bezel 8 to represent "50", the minute hand 12 indicates between "5" and "6" of the numerical indicators 18 on the bezel 8 to represent "5", and the hour hand 11 indicates between "1" and "2" of the numerical indicators 18 on the bezel 8 to represent "1". Thus, it can be seen that the hour hand 11, the minute hand 12, and the seconds hand 13 are combined to represent a numerical value "1550". Here, note that, a relative positional relationship of the respective hands differs between the time mode where display is performed in duodecimal or sexagesimal, and the altitude mode where display is performed in decimal. For example, when 3 o'clock is represented in the time mode, the hour hand 11 is at a position rotated by 90 degrees right relative to 12 o'clock, and the minute hand 12 is at a 0 degrees position. On the other hand, when "3000" is represented in the altitude mode, then the hour hand 11 is at 108 degrees and the minute hand 12 is at 0 degrees. In time display, the hour hand 11 and the minute hand 12 are not in such a positional relationship.

As described above, in the relationship between the minute hand 12 and the seconds hand 13, the minute hand 12 is a first hand indicating a higher digit of numerical information, and the seconds hand 13 is a second hand indicating a lower digit of the numerical information. In this case, the minute motor 42 is the first motor, and the seconds motor 43 is the second motor. In addition, in the relationship between the hour hand 11 and the minute hand 12, the hour hand 11 is a first hand indicating a higher digit of numerical information, and the minute hand 12 is a second hand indicating a lower digit of the numerical information. In this case, the hour motor 41 is a first motor, and the minute motor 42 is a second motor.

When an airplane where the electronic watch 1 set to the altitude mode is placed takes off, altitude continues to rise, so a numerical value of the altitude changes quickly, leading to a state where fast-forward of the hands is required. In the altitude mode, for example, as illustrated in FIG. 11, when the drive frequency of the seconds motor 43 is set to 30 Hz, the drive frequency of the minute motor 42 is 36 Hz, and the drive frequency of the hour motor 41 is set to 4 Hz, the angular velocity of the seconds hand 13 is 180 dps, the angular velocity of the minute hand 12 is 18 dps, and the angular velocity of the hour hand 11 is 2 dps.

In numerical display, the minute hand 12 representing the hundreds place needs to make $1/10$ laps while the seconds hand 13 representing the tens and ones places each make a lap, and when the seconds hand 13 and the minute hand 12 are mechanically interlocked, the angular velocity of the hand movement of the seconds hand 13 needs to be 10 times the angular velocity of the hand movement of the minute hand 12. That is, when the minute hand 12 is a first hand, and the seconds hand 13 is a second hand, the angular velocity of the hand movement of the minute hand 12 is $1/10$ of the angular velocity of the hand movement of the seconds hand 13. When the seconds motor 43 and the minute motor 42 are set to the above-described frequencies, respectively, and the hand movement is performed simultaneously, an angular velocity ratio is the same as when the hands are mechanically interlocked, so it is possible to represent an increase or decrease in a numerical value without uncomfortable feeling.

In addition, in the numerical display, the hour hand 11 representing the thousands place needs to make $1/10$ laps while the minute hand 12 representing the hundreds place makes a lap, and when the hour hand 11 and the minute hand 12 are mechanically interlocked, the angular velocity of the hand movement of the minute hand 12 needs to be 10 times the angular velocity of the hand movement of the hour hand 11. That is, when the hour hand 11 is a first hand, and the minute hand 12 is a second hand, the angular velocity of the hand movement of the hour hand 11 is $1/10$ of the angular velocity of the hand movement of the minute hand 12.

As described above, when the minute motor 42 is driven at 36 Hz, the angular velocity of the minute hand 12 representing the hundreds place is 18 dps, and is only nine times the angular velocity 2 dps of the hour hand 11 representing the thousands place. Thus, when hand movement is started approximately simultaneously, the hand movement of the hour hand 11 representing the thousands place ends earlier. In this case as well, however, in the altitude mode, a numerical value is updated by measuring each second by the atmospheric pressure sensor 7, so a shift of relative positions of the hour hand 11 and the minute hand 12 does not accumulate.

Next, every second measurement display processing S40 by the measurement controller 24 in an atmospheric pressure mode will be described with reference to a flowchart of FIG. 12. When starting the every second measurement display processing S40 in response to an interruption per second from a timer, the measurement controller 24 first performs step S41, performs atmospheric pressure measurement using the atmospheric pressure sensor 7, and calculates altitude from an atmospheric pressure measured. Next, the measurement controller 24 performs step S42, and calculates, from the calculated altitude and current hand positions, the numbers of hand movement driving steps of each hand, that is, the numbers of driving steps i, j, and k of the respective stepping motors 41 to 43. Here, i is the number of driving steps of the seconds motor 43, j is the number of driving steps of the minute motor 42, and k is the number of driving steps of the hour motor 41.

Next, the measurement controller 24 performs step S43 to set the drive frequency Fsec of the seconds motor 43 to 30 Hz, performs step S44 to set the drive frequency Fmin of the minute motor 42 to 36 Hz, and performs step S45 to set a drive frequency Fhour of the hour motor 41 to 4 Hz.

Next, the measurement controller 24 performs step S46 to set the number of driving steps Ssec of the seconds motor 43 to i, performs step S47 to set the number of driving steps Smin of the minute motor 42 to j, and performs step S48 to set the number of driving steps Shour of the hour motor 41 to k.

After setting the drive frequencies and the numbers of driving steps, the measurement controller 24 performs steps S49, S50, and S51, and outputs a drive signal to the motor drivers 33, 32, and 31, and starts driving of the seconds motor 43, the minute motor 42, and the hour motor 41, respectively.

After starting of the driving, the measurement controller 24 performs step S52 to determine whether the driving of the seconds motor 43, the minute motor 42, and the hour motor 41 has ended or not.

When determining NO in step S52, the measurement controller 24 continues the hand movement of the seconds hand 13, the minute hand 12, and the hour hand 11, and repeats the determination processing in step S52. In addition, when determining YES in step S52, the measurement controller 24 ends the every second measurement display processing S40, because the seconds hand 13, the minute hand 12, and the hour hand 11 each have reached a target position.

Note that, the measurement controller 24 starts the every second measurement display processing S40 at one second interval in interruption processing, and thus, when the every second measurement display processing S40 is started after one second has elapsed before the every second measurement display processing S40 ends, the number of steps is calculated from a position of the hand at the time point to a position indicating a measurement value in steps S41 and S42, and the drive frequency and the number of driving steps are set in steps S43 to S48, and hand movement is performed to a new target value in steps S49 to S51.

According to such a third exemplary embodiment, the altitude based on the atmospheric pressure measured by the atmospheric pressure sensor 7 can be indicated with the hour hand 11, the minute hand 12, the seconds hand 13, and the numerical indicators 18. Also, even when the altitude changes quickly, and the hour hand 11, the minute hand 12, and the seconds hand 13 are fast-forwarded, hand movement of the hour hand 11, the minute hand 12, and the seconds hand 13 is performed in an interlocked manner, the hand movement is performed similarly to a case of an analog meter for indicating a numerical value, thus the user does not feel uncomfortable with the hand movement of the hands, and the indication by the hands can be easily read.

In addition, when the seconds hand 13 and the minute hand 12 are mechanically interlocked, the angular velocity ratio of the seconds hand 13 and the minute hand 12 cannot be adjusted, depending on whether a numerical value is represented in decimal or time is represented in duodecimal (sexagesimal). On the other hand, in the present exemplary embodiment, since hand movement of each hand is independently performed, the angular velocity ratio of the seconds hand 13 and the minute hand 12 can be set to a value suitable for both in numerical display in decimal and in time display in duodecimal (sexagesimal). Thus, the electronic watch 1 can smoothly represent fast-forward in any display in the time mode and the altitude mode.

Note that, when two digits of the thousands place and the hundreds place are represented by the minute hand 12, the minute hand 12 needs to make 1/100 laps while the seconds hand 13 makes a lap. In this case, it is sufficient that the drive frequency of the motor is set such that the angular velocity of the seconds hand 13 is 100 times the angular velocity of the minute hand 12.

Fourth Exemplary Embodiment

Figure 13:
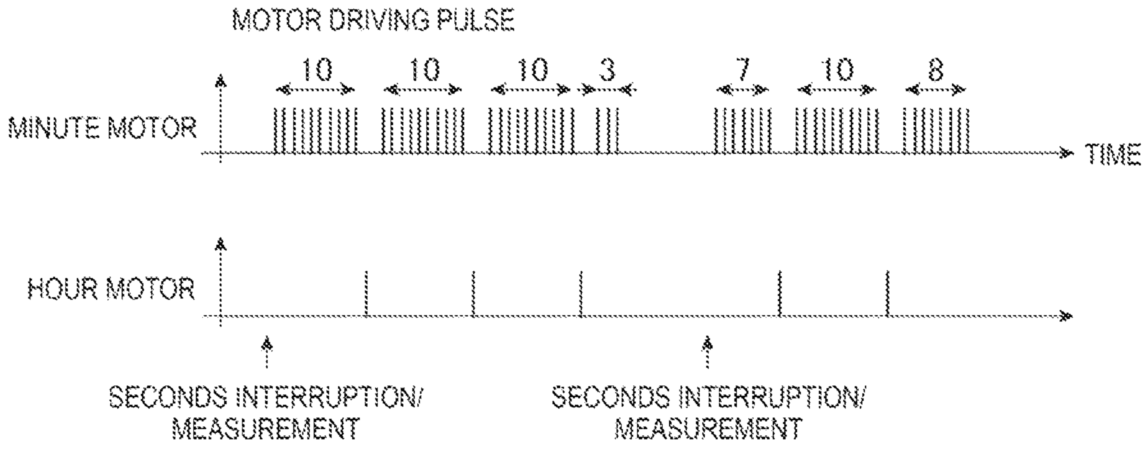
FIG. 13 is a timing chart illustrating driving operation in a numerical value indication mode according to a fourth exemplary embodiment.
Figure 14:
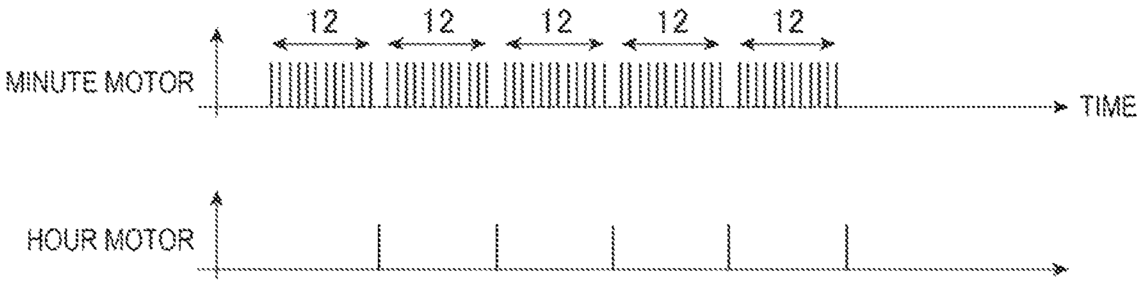
FIG. 14 is a timing chart illustrating driving operation in a time correction mode according to the fourth exemplary embodiment.

Next, a fourth exemplary embodiment will be described with reference to FIG. 13 and FIG. 14. The fourth exemplary embodiment is another hand movement method in the altitude mode and a watch mode of the electronic watch 1.

Description will be given by using the hour hand 11 representing the thousands place and the minute hand 12 representing the hundreds place in the altitude mode as an example. The hour hand 11 and the minute hand 12 are each coupled to a motor with a train wheel having the same deceleration ratio where the hand makes a lap, while each motor operates by 720 steps. The angular velocity of the minute hand 12 is 10 times the angular velocity of the hour hand 11, because the hour hand 11 representing the thousands place needs to make 1/10 laps, while the minute hand 12 representing the hundreds place makes a lap. Conversely, when the hour motor 41 driving the hour hand 11 operates by one step each time the minute motor 42 driving the minute hand 12 operates by 10 steps, the angular velocity relationship between the hour hand 11 and the minute hand 12 can be maintained to be 10 times. FIG. 13 is a control example when the hand movement is performed by "+25 (00)", after hand movement of the thousands place and the hundreds place is performed by "+33(00)". The measurement controller 24 drives the hour motor 41 driving the hour hand 11, which represents the thousands place, by one step, each time the minute motor 42 driving the minute hand 12, which represents the hundreds place, by 10 steps, and repeats this.

By frequently repeating the driving of the minute hand 12 and the driving of the hour hand 11 in this way, the numerical display can be fast-forwarded smoothly, while keeping the relative positional relationship between the hour hand 11 and the minute hand 12 in an appropriate state as numerical hand movement.

On the other hand, when time is fast-forwarded in the time mode, the hour hand 11 needs to make 1/12 laps, while the minute hand 12 makes a lap. Thus, the angular velocity of the minute hand 12 is 12 times the angular velocity of the hour hand 11. As in the case of the numerical display in the altitude mode, as illustrated in FIG. 14, when the hour motor 41 driving the hour hand 11 operates by one step each time the minute motor 42 driving the minute hand 12 operates by 12 steps, the angular velocity relationship between the hour hand 11 and the minute hand 12 can be maintained to be 12 times.

In this manner, in the electronic watch 1, by changing the number of driving steps of the minute hand 12 corresponding to one step hand movement of the hour hand 11 between the time display and the numerical display, the angular velocity ratio of the minute hand 12 and the hour hand 11 can be set to a value suitable both in the numerical display in decimal and the time display in duodecimal (sexagesimal). Thus, in both the display, fast-forward can be represented smoothly.

Other Exemplary Embodiments

The present disclosure is not limited to each of the above-described embodiments, and modifications, improvements, and the like within the scope in which the object of the present disclosure can be achieved are included in the present disclosure.

For example, in the exemplary embodiment described above, the description has been given by using the altimeter function using the atmospheric pressure sensor for the fast-forward hand movement in the numerical display in decimal as an example, but the present disclosure is useful to display measurement values by various sensors, such as atmospheric pressure itself, water pressure by a hydraulic sensor, water depth calculated from water pressure, temperature from a temperature sensor, a heart rate by an optical sensor, and various numerical values.

In the exemplary embodiment described above, the time indicators 16 are provided at the dial, but in the time mode, the time indicators 16 need not be provided, because time can be read with positions indicated by the hour hand 11, the minute hand 12, and the seconds hand 13, respectively.

In the above-described exemplary embodiment, in addition to the time display mode and the time correction mode, the numerical value indication mode is provided, however, the present disclosure can also be applied to an electronic watch that includes only the time display mode and the time correction mode, without the numerical value indication mode.

On the other hand, as in the exemplary embodiment described above, in the case of an electronic watch including the numerical value indication mode in addition to the time modes of the time display mode and the time correction mode, a drive frequency of a first motor and a drive frequency of a second motor can be controlled such that angular velocity of hand movement of a first hand is less than angular velocity of hand movement of a second hand, and a relative positional relationship of the respective hands in the time mode, and a relative positional relationship of the respective hands in the numerical value indication mode can each be appropriately set.

Summary of Present Disclosure

An electronic watch according to the present disclosure includes a first hand configured to be rotated by a first motor and indicate a higher digit of numerical information or time information, a second hand configured to be rotated by a second motor, and indicate a lower digit of the numerical information or the time information, and a motor controller configured to control the first motor and the second motor, wherein the motor controller is configured to be capable of performing a numerical value indication mode for simultaneously driving the first motor and the second motor to indicate an increase or decrease in the numerical information by hand movement of each of the hands, or a time correction mode for simultaneously driving the first motor and the second motor to correct the time information, and in the numerical value indication mode or the time correction mode, controls a drive frequency of the first motor and a drive frequency of the second motor such that angular velocity of hand movement of the first hand is less than angular velocity of hand movement of the second hand.

According to the electronic watch of the present disclosure, when numerical information is increased or decreased, or when time information is corrected by fast-forward or the like, by setting the angular velocity of the first hand indicating the higher digit to be less than the angular velocity of the second hand indicating the lower digit, hand movement of the first hand can be prevented from ending too early with respect to hand movement of the second hand, even when the hand movement is simultaneously started for the first hand and the second hand. Thus, the hand movement can be simultaneously performed for the first hand and the second hand, and an increase or decrease in a numerical value or a value of time can be displayed with continuity, and it is possible to prevent the user from feeling uncomfortable with the hand movement as compared to a case where one hand decelerates and hand movement of another hand is started.

The electronic watch according to the present disclosure includes a numerical indicator configured to indicate a numerical value in decimal, wherein the motor controller may be configured to be capable of performing the numerical value indication mode, while performing the numerical value indication mode, indicate the numerical indicator with the first hand to indicate a higher digit of the numerical information, indicate the numerical indicator with the second hand to indicate a lower digit of the numerical information, and control the drive frequency of the first motor and the drive frequency of the second motor such that, when the first hand indicates a single digit numerical value with one lap, the angular velocity of the hand movement of the first hand is 1/10 of the angular velocity of the hand movement of the second hand, and when the first hand indicates a double digit numerical value with one lap, the angular velocity of the hand movement of the first hand is 1/100 of the angular velocity of the hand movement of the second hand.

According to the electronic watch of the present disclosure, a hand movement angular velocity ratio of the first hand and the second hand is the same as when the first hand and second hand are mechanically interlocked, thus the hand movement can be more naturally performed. Also, the hand movement can be started simultaneously for the two hands, and the hand movement is performed with the same positional relationship as when the respective hands are mechanically interlocked, thus the user can easily grasp an increase or decrease in a value during the hand movement. In addition, because the hand movement can be stopped simultaneously for the respective hands, the user can immediately read a value indicated at the time of stop.

In the electronic watch according to the present disclosure, the motor controller may be configured to be capable of performing the time correction mode, and while performing the time correction mode, indicate hours of the time information with the first hand, indicate minutes of the time information with the second hand, and control the drive frequency of the first motor and the drive frequency of the second motor such that the angular velocity of the hand movement of the first hand is 1/12 of the angular velocity of the hand movement of the second hand.

According to the electronic watch of the present disclosure, a hand movement angular velocity ratio of the first hand functioning as the hour hand, and the second hand functioning as the minute hand is the same as when the hour hand and the minute hand are mechanically interlocked, thus hand movement for an increase or decrease in time display can be performed without uncomfortable feeling. Also, the hand movement can be started simultaneously for the two hands, and the hand movement is performed with the same positional relationship as when the respective hands are mechanically interlocked, thus the user can easily grasp an increase or decrease in time by viewing the hands during the hand movement. In addition, because the hand movement can be stopped simultaneously for the respective hands, the user can immediately read time indicated at the time of stop.

In the electronic watch according to the present disclosure, the motor controller may be configured to be capable of performing the time correction mode, and while performing the time correction mode, indicate minutes of the time information with the first hand, indicate seconds of the time information with the second hand, and control the drive frequency of the first motor and the drive frequency of the second motor such that the angular velocity of the hand movement of the first hand is 1/60 of the angular velocity of the hand movement of the second hand.

According to the electronic watch of the present disclosure, a hand movement angular velocity ratio of the first hand functioning as the minute hand, and the second hand functioning as the seconds hand is the same as when the minute hand and the seconds hand are mechanically interlocked, thus hand movement for an increase or decrease in time display can be performed without uncomfortable feeling. Also, the hand movement can be started simultaneously for the two hands, and the hand movement is performed with the same positional relationship as when the respective hands are mechanically interlocked, thus the user can easily grasp an increase or decrease in time by viewing the hands during the hand movement. In addition, because the hand movement can be stopped simultaneously for the respective hands, the user can immediately read time indicated at the time of stop.

In the electronic watch according to the present disclosure, the motor controller, while performing the numerical value indication mode or the time correction mode, may perform correction processing for correcting a relative position between a position of the first hand and a position of the second hand at intervals of a predetermined time or a predetermined number of hand movement steps.

According to the electronic watch of the present disclosure, when continuously changing numerical information or time information is displayed, accumulation of errors in a relative positional relationship between the first hand and the second hand can be prevented. This can reduce uncomfortable feeling in display.

An electronic watch according to the present disclosure includes a first hand, a first train wheel coupled to the first hand, a first motor configured to drive the first hand via the first train wheel, a second hand, a second train wheel coupled to the second hand, a second motor configured to drive the second hand via the second train wheel, and a motor controller configured to drive the first motor and the second motor, wherein the motor controller is configured to be capable of selecting and performing a time display mode for moving the first hand and the second hand to indicate a higher digit of time information measured, and a lower digit thereof, a time correction mode for moving the first hand and the second hand to indicate a higher digit of time information corrected, and a lower digit thereof, and a numerical value indication mode for indicating a higher digit of numerical information increasing or decreasing, and a lower digit thereof, with the first hand and the second hand, while performing the time correction mode or the numerical value indication mode, moves the second hand by a prescribed number of steps corresponding to one step of the first hand, and then repeats operation of moving the first hand by one step to move the first hand to a target position, and the prescribed number of steps is different between the time correction mode and the numerical value indication mode.

According to the electronic watch of the present disclosure, when display of numerical information or time information is increased or decreased, by repeating an operation for moving the second hand by an amount corresponding to one step of the first hand, and then moving the first hand by one step, to move the first hand to target positions, it is possible to prevent errors in the relative positional relationship between the first hand and the second hand from being accumulated, and uncomfortable feeling in display can be reduced. Furthermore, in each of the numerical information and the time information, display without uncomfortable feeling can be achieved in a compatible manner.

The electronic watch according to the present disclosure includes a sensor configured to measure a physical amount, and a measurement controller configured to control the sensor to acquire a physical amount, and calculate the numerical information from the acquired physical amount, wherein the motor controller, while performing the numerical value indication mode, may indicate the numerical information using the first hand and the second hand.

According to the electronic watch of the present disclosure, in the electronic watch including the sensor for measuring a physical amount, hand movement with less uncomfortable feeling can be realized when a physical amount that changes from time to time is indicated with hands.

What is claimed is:

1. An electronic watch, comprising:

a first hand configured to be rotated by a first motor, and indicate a higher digit of numerical information or time information;

a second hand configured to be rotated by a second motor, and indicate a lower digit of the numerical information or the time information; and a motor controller configured to control the first motor and the second motor so as to:

perform a numerical value indication mode for simultaneously driving the first motor and the second motor to indicate an increase or decrease in the numerical information by hand step movement of each of the first and second hands, or a time correction mode for simultaneously driving the first motor and the second motor to correct the time information; and in the numerical value indication mode or the time correction mode, the motor controller is further configured to:

control a drive frequency of the first motor and a drive frequency of the second motor such that angular velocity of the hand step movement of the first hand is less than angular velocity of the hand step movement of the second hand;

control the first motor to cause the first hand to stop for a first period of time after the first hand moves a plurality of steps as the hand step movement while the second motor causes the second hand to continuously move as the hand step movement; and control the first motor to move the first hand as the hand step movement after the first period of time elapses while the second motor causes the second hand to continuously move as the hand step movement.

2. The electronic watch according to claim 1, comprising:

a numerical indicator configured to indicate a numerical value in decimal, wherein while the motor controller is configured to perform the numerical value indication mode, the motor controller is further configured to:

indicate the numerical indicator with the first hand to indicate a higher digit of the numerical information; and indicate the numerical indicator with the second hand to indicate a lower digit of the numerical information, and the motor controller is configured to control the drive frequency of the first motor and the drive frequency of the second motor such that, when the first hand indicates a single digit numerical value with one lap, the angular velocity of the hand step movement of the first hand is 1/10 of the angular velocity of the hand step movement of the second hand, and when the first hand indicates a double digit numerical value with one lap, the angular velocity of the hand step movement of the first hand is 1/100 of the angular velocity of the hand step movement of the second hand.

3. The electronic watch according to claim 1, wherein while the motor controller is configured to perform the time correction mode, the motor controller is further configured to:

indicate hours of the time information with the first hand; and indicate minutes of the time information with the second hand, and the motor controller is configured to control the drive frequency of the first motor and the drive frequency of the second motor such that the angular velocity of the hand step movement of the first hand is 1/12 of the angular velocity of the hand step movement of the second hand.

4. The electronic watch according to claim 1, wherein while the motor controller is configured to perform the time correction mode, the motor controller is further configured to:

indicate minutes of the time information with the first hand; and indicate seconds of the time information with the second hand, and the motor controller is configured to control the drive frequency of the first motor and the drive frequency of the second motor such that the angular velocity of the hand step movement of the first hand is 1/60 of the angular velocity of the hand step movement of the second hand.

5. The electronic watch according to claim 1, wherein while the motor controller is configured to perform the numerical value indication mode or the time correction mode, the motor controller is configured to perform correction processing for correcting a relative position between a position of the first hand and a position of the second hand at intervals of a predetermined time or a predetermined number of hand movement steps.

6. The electronic watch according to claim 1, comprising:

a sensor configured to measure a physical amount; and a measurement controller configured to control the sensor to acquire the physical amount, and calculate the numerical information from the acquired physical amount, wherein while the motor controller is configured to perform the numerical value indication mode, the motor controller is configured to indicate the numerical information using the first hand and the second hand.

7. An electronic watch, comprising:

a first hand configured to be rotated by a first motor, and indicate a higher digit of numerical information or time information;

a second hand configured to be rotated by a second motor, and indicate a lower digit of the numerical information or the time information;

a motor controller configured to control the first motor and the second motor so as to:

perform a numerical value indication mode for simultaneously driving the first motor and the second motor to indicate an increase or decrease in the numerical information by hand step movement of each of the first and second hands, or a time correction mode for simultaneously driving the first motor and the second motor to correct the time information; and in the numerical value indication mode or the time correction mode, the motor controller is further configured to control a drive frequency of the first motor and a drive frequency of the second motor such that angular velocity of the hand step movement of the first hand is less than angular velocity of the hand step movement of the second hand; and a numerical indicator configured to indicate a numerical value in decimal, wherein while the motor controller is configured to perform the numerical value indication mode, the motor controller is further configured to:

indicate the numerical indicator with the first hand to indicate a higher digit of the numerical information; and indicate the numerical indicator with the second hand to indicate a lower digit of the numerical information, and the motor controller is configured to control the drive frequency of the first motor and the drive frequency of the second motor such that, when the first hand indicates a single digit numerical value with one lap, the angular velocity of the hand step movement of the first hand is 1/10 of the angular velocity of the hand step movement of the second hand, and when the first hand indicates a double digit numerical value with one lap, the angular velocity of the hand step movement of the first hand is 1/100 of the angular velocity of the hand step movement of the second hand.

* * * * *